(12) United States Patent
Allen et al.

(10) Patent No.: US 8,928,911 B2
(45) Date of Patent: Jan. 6, 2015

(54) FULFILLMENT UTILIZING SELECTED NEGOTIATION ATTRIBUTES

(75) Inventors: William J. Allen, Corvallis, OR (US); David Stone, Lino Lakes, MN (US); Sean Morrison, O'Fallon, MO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1021 days.

(21) Appl. No.: 12/750,536

(22) Filed: Mar. 30, 2010

(65) Prior Publication Data

US 2011/0242576 A1   Oct. 6, 2011

(51) Int. Cl.
  G06F 3/12    (2006.01)
(52) U.S. Cl.
  CPC .......... G06F 3/1204 (2013.01); G06F 3/1288 (2013.01); G06F 3/1272 (2013.01); G06F 3/1287 (2013.01); G06F 3/1253 (2013.01); G06F 3/126 (2013.01); G06F 3/1205 (2013.01)
  USPC ........ 358/1.15; 358/1.13; 705/26.1; 709/203; 710/38; 715/783

(58) Field of Classification Search
  None
  See application file for complete search history.

(56) References Cited

U.S. PATENT DOCUMENTS

| | | | |
|---|---|---|---|
| 5,090,231 A * | 2/1992 | Gallagher | 702/92 |
| 5,862,471 A * | 1/1999 | Tiedemann et al. | 455/406 |
| 5,991,846 A | 11/1999 | Ooki | |
| 6,285,889 B1 | 9/2001 | Nykanen | |
| 6,335,795 B1 * | 1/2002 | Neuhard et al. | 358/1.15 |
| 6,359,642 B1 | 3/2002 | Smith | |
| 6,417,913 B2 | 7/2002 | Tanaka | |
| 6,560,621 B2 | 5/2003 | Barile | |
| 6,621,589 B1 | 9/2003 | Al-Kazily et al. | |
| 6,678,064 B2 | 1/2004 | Bruce | |
| 6,757,070 B1 | 6/2004 | Lin et al. | |
| 6,762,852 B1 | 7/2004 | Fischer | |
| 7,064,856 B2 | 6/2006 | Fu et al. | |
| 7,088,462 B2 | 8/2006 | Bhogal et al. | |
| 7,120,667 B2 | 10/2006 | Derocher et al. | |
| 7,143,210 B2 | 11/2006 | Ferlitsch | |
| 7,212,297 B2 | 5/2007 | Liang et al. | |
| 7,225,220 B2 | 5/2007 | Gonzalez et al. | |

(Continued)

FOREIGN PATENT DOCUMENTS

| | | |
|---|---|---|
| EP | 1107512 | 6/2001 |
| EP | 1271300 | 1/2003 |

(Continued)

OTHER PUBLICATIONS

Yang et al.; "Offer with Choices and Accept with Delay: A Win-Win Strategy Model for Agent Based Automated Negotiation"; ICIS 2009 Proceedings; 20 pages.

(Continued)

Primary Examiner — David S Cammack
(74) Attorney, Agent, or Firm — Garry Perry

(57) ABSTRACT

In one embodiment, a fulfillment request is received. A solution set comprising a plurality of fulfillment solutions is determined. The solution set, including values for fulfillment solutions according to a plurality of negotiation attributes, is presented. Selection of a negotiation attribute to be prioritized is invited. The solution set is redetermined according to a selected negotiation attribute. A redetermined solution set is presented. The fulfillment request is fulfilled according to a solution selected from the redetermined solution set.

20 Claims, 8 Drawing Sheets

(56) References Cited

U.S. PATENT DOCUMENTS

| | | |
|---|---|---|
| 7,231,605 B1 | 6/2007 | Ramakesavan |
| 7,265,867 B2 | 9/2007 | Fu et al. |
| 7,272,407 B2 | 9/2007 | Strittmatter et al. |
| 7,647,074 B2 | 1/2010 | McCoog et al. |
| 7,800,768 B2 | 9/2010 | Yamada |
| 8,115,943 B2 | 2/2012 | Ohishi et al. |
| 8,223,355 B2 | 7/2012 | McCoog et al. |
| 8,270,007 B2 | 9/2012 | Pandit et al. |
| 8,468,240 B2 | 6/2013 | Prati et al. |
| 2001/0013053 A1* | 8/2001 | Yamazaki ............ 709/203 |
| 2001/0043357 A1* | 11/2001 | Owa et al. ............ 358/1.15 |
| 2002/0083121 A1 | 6/2002 | Chang |
| 2003/0036350 A1 | 2/2003 | Jonsson |
| 2003/0115199 A1 | 6/2003 | Ochiai |
| 2003/0184557 A1* | 10/2003 | Wen ............... 345/590 |
| 2003/0231328 A1 | 12/2003 | Chapin et al. |
| 2004/0039647 A1 | 2/2004 | Roche et al. |
| 2004/0100505 A1 | 5/2004 | Cazier |
| 2004/0162804 A1 | 8/2004 | Strittmatter et al. |
| 2004/0176117 A1 | 9/2004 | Strittmatter et al. |
| 2004/0176118 A1 | 9/2004 | Strittmatter et al. |
| 2004/0218201 A1 | 11/2004 | Lermant et al. |
| 2004/0252332 A1 | 12/2004 | McCoog et al. |
| 2004/0253990 A1 | 12/2004 | McCoog et al. |
| 2005/0073522 A1 | 4/2005 | Aholainen |
| 2005/0088681 A1* | 4/2005 | Hosoda ............ 358/1.14 |
| 2005/0099639 A1 | 5/2005 | Payne et al. |
| 2005/0259287 A1 | 11/2005 | Watanabe |
| 2006/0259394 A1* | 11/2006 | Cushing et al. ............ 705/37 |
| 2007/0010915 A1* | 1/2007 | Burson et al. ............ 700/284 |
| 2007/0030516 A1 | 2/2007 | Tsuji et al. |
| 2007/0195345 A1 | 8/2007 | Martinez et al. |
| 2007/0229879 A1 | 10/2007 | Harmon et al. |
| 2007/0229880 A1 | 10/2007 | Harmon et al. |
| 2008/0180726 A1 | 7/2008 | Selvaraj |
| 2008/0225326 A1* | 9/2008 | Kephart et al. ............ 358/1.15 |
| 2008/0239366 A1 | 10/2008 | Cyman et al. |
| 2008/0246988 A1 | 10/2008 | Ashton |
| 2009/0033976 A1 | 2/2009 | Ding |
| 2009/0147299 A1 | 6/2009 | Tetu |
| 2009/0257082 A1 | 10/2009 | Kohli et al. |
| 2009/0300226 A1 | 12/2009 | Rubio |
| 2010/0082782 A1 | 4/2010 | Ding |
| 2010/0161832 A1 | 6/2010 | Komine |
| 2010/0174698 A1* | 7/2010 | Odland et al. ............ 707/706 |
| 2010/0309508 A1 | 12/2010 | Kamath et al. |
| 2011/0145085 A1* | 6/2011 | Khachatrian et al. ....... 705/26.1 |
| 2012/0019867 A1 | 1/2012 | Prati et al. |
| 2013/0038897 A1 | 2/2013 | Heckler et al. |
| 2013/0222838 A1 | 8/2013 | Kumar et al. |

FOREIGN PATENT DOCUMENTS

| | | | |
|---|---|---|---|
| GB | 2360914 | | 10/2001 |
| JP | 2001197150 | | 7/2001 |
| JP | 2001344163 | | 12/2001 |
| JP | 2002112347 | | 4/2002 |
| JP | 2002264431 | A | 9/2002 |
| JP | 2002290416 | A | 10/2002 |
| JP | 2002305521 | A | 10/2002 |
| JP | 2006277197 | A * | 10/2006 |
| WO | 0174011 | | 10/2001 |
| WO | WO-2011011117 | A1 | 8/2011 |
| WO | WO-2011090474 | A1 | 8/2011 |

OTHER PUBLICATIONS

Yinping, et al.,; "Designing an Intelligent Agent that Negotiates Tactfully with Human Counterparts: A conceptual Analysis and Modeling Framework" 42nd Hawaii ICSS-2009; 10 pgs.

"Xerox® Enterprise Print Services Connecting the Remote and Mobile Workforce," Sep. 2010, <http://www.xerox.com/downloads/usa/en/xgs/brochures/.

Assigned Numbers—Bluetooth Baseband, Bluetooth Sig. Inc., 2003 www.bluetooth.org/foundry/assignnumb/document/baseband.

Bluetooth, "The Bluetooth System, Core, Version 1.0 B," Service Discovery Protocol SDP, Dec. 1, 1999, XP002176975, retrieved on Sep. 7, 2001, retrieved from the internet: <www.bluetooth.com>.

Communication pursuant to Article 96(2) EPC issued in connection with European patent application No. 03022525, dated Dec. 16, 2004.

European Search Report Issued in connection with European patent application No. 03022525, dated Jan. 29, 2004.

Hewlett-Packard Co., HP Jornada 520, 540 and 560 Series Pocket PC and HP Deskjet 995C—Printing with Bluetooth Using the Anycom, Inc. Bluetooth Card, On-Line Customer Support Documents, 2001, www.hp.com/cposupport/printers/supp.

Hewlett-Packard Development Company, L.P, "HP Universal Print Driver," Apr. 2009, <http://www.govenorsolutions.com/wp-content/uploads/2011/08/UPD-2009-DS-final1.pdf>.

Hewlett-Packard Development Company, L.P, "HP Universal Print Driver," Solution and Feature Guide, 2009, <http://h20331.www2.hp.com/Hpsub/downloads/UPD5_guide_final,%20web.pdf>.

Mirosoft Corp., "To search for a printer," Jan. 6, 2008, <http://web.archive.org/web/20080106161518/http://www.microsoft.com/resources/docum.

Service Discovery Application Profile, Feb. 22, 2001, pp. 64-98, Bluetooth Specification Version 1.1.

Taylor Thomas, "Online Printing Services Review," Mimeo, available online Aug. 21, 2009, <http://web.archive.org/web/20090821133549/http://online-printing-services-review.toptenreviews. com/mimeo-review.html>.

David Suffield, "HPLIP 2008 State of Affair," Apr. 2008, http://www.linuxfoundation.org/images/6/6d/Hplip_2008.pdf>.

Hewlett-Packard Devlopment Company, L.P., "HP Driver and Queue Management Solutions," Mar. 2009, <http://h20195.www2.hp.com/v2GetDocument.aspxcc=us&doclang=EN_US&docname=4AA1-5596ENUC&doctype=brochure&lc=en&searchquery=&jumpid=reg_r1002_usen_c-001_title_r0002>.

Hewlett-Packard Development Company, L.P., "HP Universal Print Driver v5.7.0.16448," Release Notes, Sep. 17, 2013, <http://h10032,www1.hp.com/ctg/Manual/c03635717.pdf>.

Hewlett-Packard Development Company, L.P., "Service Administration Guide," HP Managed Printing Administration, edition 1, May 2006.

Xerox Corp., "Xerox® Enterprise Print Services Connecting the Remote and Mobile Workforce," Sep. 2010, <http://www.xerox.com/downloads/usa/en/xgs/brochures/xgs_brochure_remote_mobile_workers_printing.pdf>.

* cited by examiner

FULFILLMENT UTILIZING SELECTED NEGOTIATION ATTRIBUTES

BACKGROUND

Some computer-based fulfillment applications present to users fulfillment options that are source-specific (i.e. the fulfillment options are presented as particular devices or service providers). For example, a user of a print job fulfillment application of this sort may select a particular device or service provider based upon known capabilities of the device or service provider. Other computer-based fulfillment applications present to users fulfillment options that are source-agnostic (i.e. the fulfillment options are presented without the necessity of disclosing particular devices or service providers). For example, a user of a print job fulfillment application of this sort may select a print solution, rather than selecting a particular device or service provider, based upon comparative cost or time to delivery. Source-agnostic fulfillment applications can be advantageous in some situations in that users are not required to have an extensive knowledge of the capabilities of devices or providers.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Applications that provide source-agnostic fulfillment solutions may present a user with set of recommended options for printing and certain characteristics regarding the printing recommended options. Such source-agnostic fulfillment applications frequently do not, however, present a user with the ability to easily negotiate or trade off multiple attributes of concern to refine recommended printing options (e.g. attributes relating to how a print job is to be delivered such as environmental impact and time to delivery, and attributes relating to the finished product such as black and white versus color and single-sided versus two-sided printing). Embodiments described below were developed in an effort to provide a method and system to present solution sets including values for fulfillment solutions according to negotiation attributes, invite selection of negotiation attributes to be prioritized, and to cause fulfillment of a fulfillment request based upon the selected negotiation attributes.

The following description is broken into sections. The first, labeled "Environment", describes an example environment in which embodiments may be implemented. The second section, labeled "Components", describes various physical and logical components utilized to implement various embodiments. The third section, labeled as "Operation", describes various example embodiments of a fulfillment method utilizing selected negotiation attributes. The fourth section, labeled "Examples", describes exemplary user interface screen shots that illustrate a fulfillment method utilizing selected negotiation attributes according to embodiment.

Figure 1:
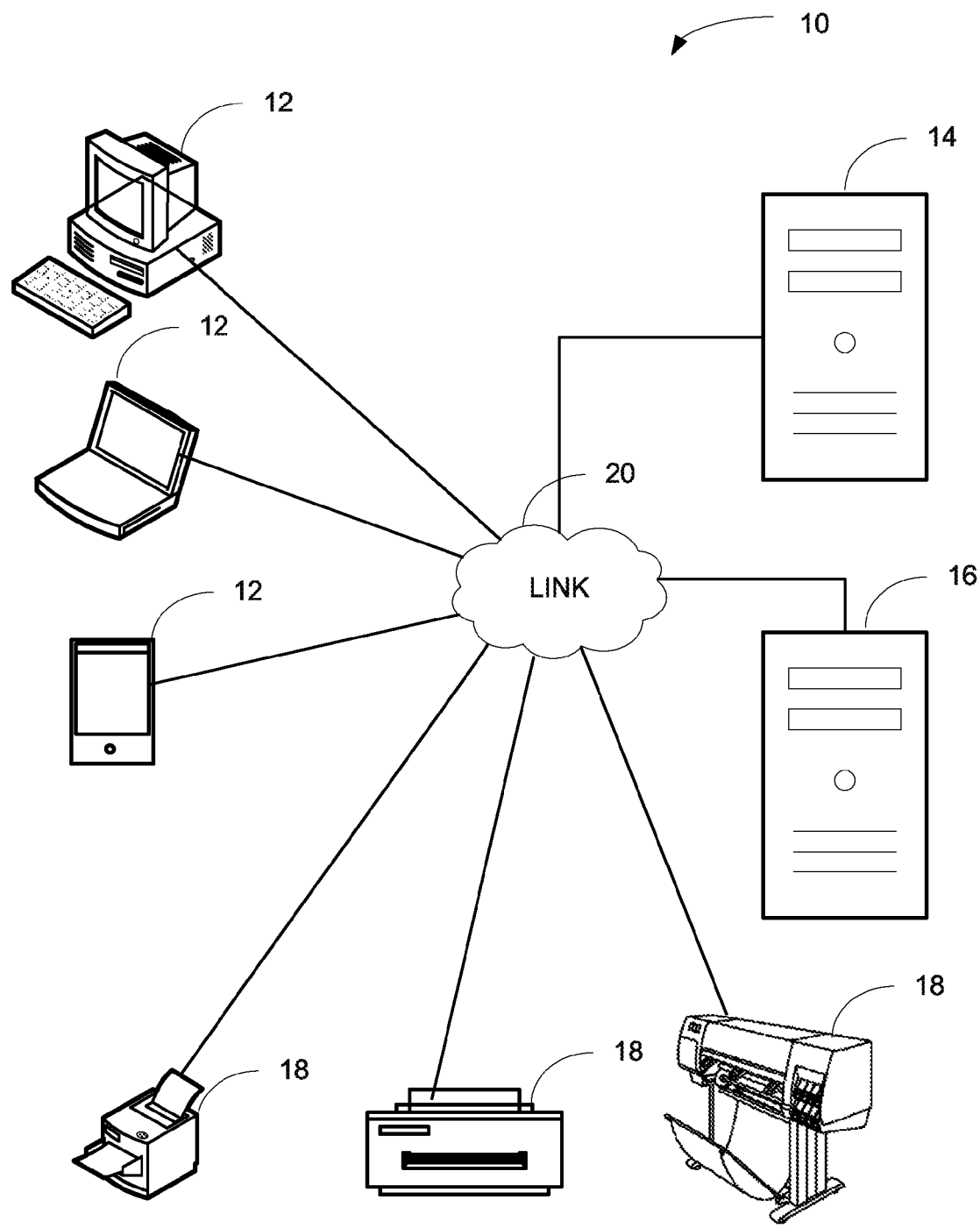
FIG. 1 depicts an example environment in which various embodiments may be implemented.

ENVIRONMENT: FIG. 1 depicts an example environment 10 in which various embodiments may be implemented. Environment 10 is shown to include computing devices 12, server 14, server 16, and printers 18. Computing devices 12 represent generally any computing device capable of sending networks requests to and otherwise communicating with server 14, server 16, and/or printers 18. Examples include desktop computers, laptop computers, smart phones, cell phones, digital tablet computers, personal digital assistants, net-books, digital media players, and the like.

Each of server 14 and server 16 represent computing devices capable of receiving and responding to network requests from computing device 12. As discussed with reference to FIGS. 2-6 below, server 14 may be a web site designed to serve requested content to computing device 12. Server 16 may be a print site operable to receive print fulfillment requests from computing device 12, and in response cause one of the printers 18 to produce printed output. Printers 18 represent generally any devices operable to produce printed output at the direction of one of a computing device 12, server 14, and server 16.

Devices 12, 14, 16, and 18 are interconnected via link 20. Link 20 represents generally one, or a combination, of a cable, wireless, fiber optic, or remote connection via a telecommunication link, an infrared link, a radio frequency link, or any other connector or system that provides electronic communication. Link 20 may represent an intranet, the internet, or a combination of both. The paths followed by link 20 between devices 12, 14, 16, and 18 as depicted in FIG. 1 represent the logical communication paths between these devices, not necessarily the physical paths between the devices.

Figure 2:
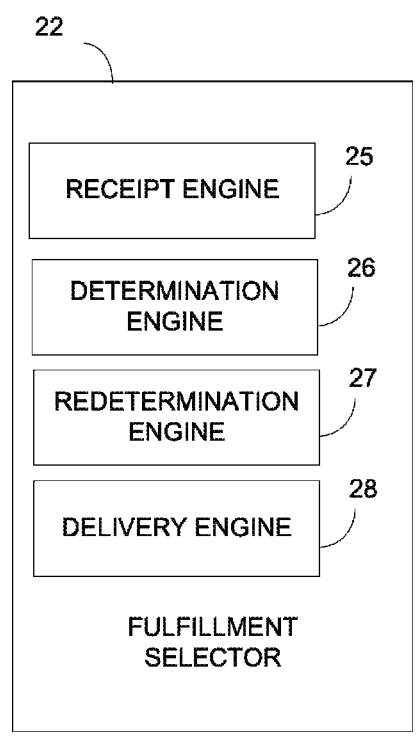
FIG. 2 depicts an example of a fulfillment selector according to an embodiment.

COMPONENTS: FIG. 2 depicts an example of a fulfillment selector 22. Fulfillment selector 22 represents generally any combination of hardware and programming configured for use to fulfill a print fulfillment request utilizing selected negotiation attributes. In the example of FIG. 2, fulfillment selector 22 is shown to include a receipt engine 25, a determination engine 26, a redetermination engine 27 and a delivery engine 28.

Receipt engine 25 represents generally any combination of hardware and programming operable to receive a print job. As used in this specification and the appended claims, a "print job" includes content that has been submitted for printing. "Print job" and "print fulfillment request" are used synonymously in this application. In an embodiment, the receipt engine is operable to receive a print job directly from a computing device, or indirectly from a computing device via an intermediary server.

Determination engine 26 represents generally any combination of hardware and programming operable to determine a solution set that includes printing solutions. As used in this specification and the appended claims, a "solution set" includes a group of recommendations for fulfilling a print job or other fulfillment request. As used in this specification and the appended claims, a "printing solution" includes a solution for fulfilling a print job. In an embodiment, determining a solution set includes analyzing the print job, which may include analyzing documents contained within the print job, and utilizing the results of analyzing the print job. In an embodiment, analyzing the print job may include gathering document and image data that can be rendered by converting a document into a device-independent format, such as .pdf. In another example, analyzing a print job may include gathering, at the time of initiation of the print job, information regarding the number of bytes in a file to be printed without a conversion operation. In another embodiment, a user or another source may provide information regarding the print job.

In an embodiment, determination engine 26 may utilize an administrative policy when determining a solution set. In an example, the determined solution set will reflect an administrative policy that limits printing options and prioritizes cost as the highest priority factor, impact to the environment as the second highest priority factor, and time to fulfillment as the third highest priority. In another example, determination engine 26 may utilize a policy that considers these factors but prioritizes them in a different order. In an embodiment an administrative policy may be utilized in a "hard" fashion by restricting some printing options such that they are not presented to a user. In an embodiment administrative polices may be utilized in a "soft" fashion by setting threshold assignments for value function operators. For example, value function symbols "$", "$$", and "$$$" may be utilized in displaying results for a negotiation attribute of relative cost. Setting thresholds for "$$" and "$$$" to lower absolute cost value estimates will likely result in more frugal behavior from users.

When determining a solution set, determination engine 26 may utilize previously-expressed preferences, and/or previously-observed behaviors of a user or a computing device or combination of hardware and software configured to select a negotiation attribute (e.g. data from previous printing fulfillment engagements that is compiled to create an enhanced characterization of individual user or aggregate user needs). Determining a solution set can include utilizing user context data. As used in this specification and the appended claims, "user context data" includes information regarding the immediate circumstances or environment of a user, such as physical location, time of day, etc., that does not require a history of user preferences or previously-observed user behavior.

Determination engine 26 is additionally operable to present a solution set including values for printing solutions according to negotiation attributes. In an embodiment, determination engine 26 presents the determined solution set to a user via a user interface such as a computer monitor providing for visual modality, or a speaker providing for auditory modality. In an embodiment, determination engine 26 presents the determined solution set to a computing device or any combination of hardware and programming configured to select negotiation attribute via electronic means. As used in this specification and the appended claims, a "negotiation attribute" includes a characteristic of concern regarding how a print job, print fulfillment or other fulfillment request may be fulfilled. In embodiments, the negotiation attributes presented may include delivery attributes and page attributes. As used in this specification and the appended claims, a "delivery attribute" includes a negotiation attribute that is associated with how, when, or where the print job is to be provided, but which is not a page attribute. Examples of delivery attributes include time-until-fulfillment, distance from the fulfilling device or service, and whether the device or service used to fulfill the print job is in-house or external. As used in this specification and the appended claims, a "page attribute" includes a negotiation attribute that is a physical characteristic of the finished product after processing of a print job. Examples of page attributes include quality or appearance of the finished product (e.g. ink or toner coverage expressed in dots per inch), color versus black and white, stapled versus unstapled, media size, media type, single sided versus duplexed, and print quality in dpi.

As used in this specification and the appended claims, a "value" of a printing solution according to a negotiation attribute suggests an assessment, grading or relative strength of a printing solution according a negotiation attribute. Presenting values for printing solutions according to negotiation attributes can include displaying value function symbols that indicate values of the negotiation attributes within each printing solution making up the solution set. In an example user interface, value function symbols "$", "$$", and "$$$" can be used to display the relative values of the negotiation attribute "cost" in printing solutions within a determined solution set. In another example user interface, value function operators expressed as distances from a user to the printing solutions are utilized to display the relative values of a "time to fulfillment" negotiation attribute. In another example user interface, zero to three "green light" graphics are assigned to each printing solution within a solution set, the green lights indicating the values of a "impact to the environment" negotiation attribute.

Redetermination engine 27 represents generally any combination of hardware and programming operable to invite selection of a negotiation attribute that is to be given priority. As used in this specification and the appended claims, "giving priority" to a negotiation attribute includes giving emphasis to or stressing that negotiation attribute. In an embodiment, inviting selection of a negotiation attribute to be prioritized is undertaken by providing to a user via button graphics displayed on a computing user device interface such as computer monitor or smart phone screen. In an example, the user interface may include invitation buttons titled "greener", "lower cost", "sooner" and "better appearance". In other embodiments different titles, or different user interfaces, can be utilized. In an embodiment, the invitation to select a negotiation attribute to be prioritized is sent in electronic form to a computing device or a combination of hardware and programming configured to select negotiation attribute via electronic means.

Redetermination engine 27 is additionally operable to redetermine a solution set according to a selected negotiation attribute. In an embodiment, the selected negotiation attribute is received after selection by a human user. In an embodiment, the selected negotiation attribute is received after selection by a computing device or a combination of hardware and programming operable to select a negotiation attribute. By selecting a negotiation attribute, a user or computing device prioritizes and expresses a preference as to which of the negotiation attributes is of the highest priority for this fulfillment. The user or computing device may also indicate, either directly or indirectly by omission, which negotiation attributes have less priority for this fulfillment. In an embodiment a user may trade off negotiation attributes of lesser priority in favor of a selected negotiation attribute, in order that the fulfillment solutions that best evidence the selected negotiation attribute will presented.

In an embodiment, a plurality of selected negotiation attributes are asynchronously received, and the solution set is redetermined after each receipt of a selected negotiation attribute. In an embodiment, asynchronous receipt of negotiation attributes occurs as new negotiation attributes are received one at a time. In an embodiment, a plurality of selected negotiation attributes are incrementally received, and the solution set is redetermined after each receipt of selected negotiation attribute. In an embodiment, incremental user selection occurs as a user clicks on multiple times, or otherwise repeatedly activates, a button graphic representing a particular negotiation attribute. In an embodiment, incremental selection of a negotiation attribute indicates that the negotiation attribute is a negotiation attribute of high concern or a priority negotiation attribute. In an embodiment, incremental selection of a negotiation attribute by a user indicates that the user desires to put additional priority upon a negotiation attribute. In an example, if a currently displayed redetermined solution set is not acceptable to a user after choosing delivery time as the selected negotiation attribute, the user may click a "sooner" button multiple times to see new redetermined solution sets with an earlier delivery times.

Redetermination engine 27 is additionally operable to present a redetermined solution set. In an embodiment, a redetermined solution set is presented to a user via a user interface with an invitation to the user to select one of the proffered redetermined solutions or to select another negotiation attribute. In an embodiment, the redetermined solution set is presented via electronic means to a computing device or a combination of hardware and programming configured to select a printing solution and/or a negotiation attribute.

Delivery engine 28 represents generally any combination of hardware and programming operable to cause a printer to fulfill the print job according to a printing solution selected from a redetermined solution set. In an embodiment, fulfilling the printing solution will include sending the print job to a networked printing device in a local environment for user pickup. In another embodiment, fulfilling the printing solution will include sending the print job to a remote print service provider that prints the print job and ships the finished product to the user.

Figure 3:
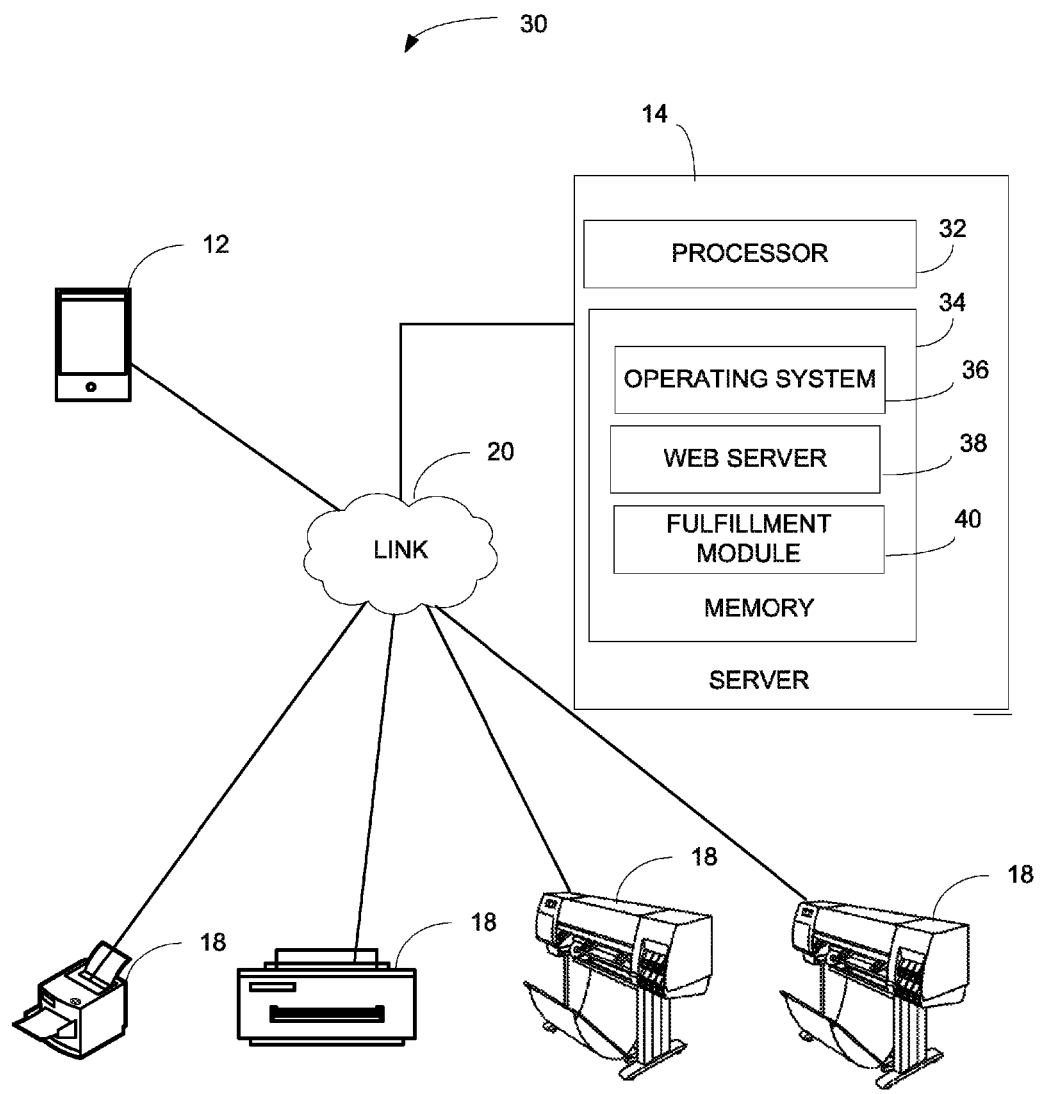
FIGS. 3-4 depict implementations of the fulfillment selector of FIG. 2 according to an embodiment.

Fulfillment selector 22 may be implemented in a number of environments, such as environment 30 of FIG. 3. Environment 30 includes a computing device 12, a link 20, a server 14 and printers 18. In an embodiment, computing device 12 may be a smart phone with internet, Bluetooth®, wireless and/or wired connectivity to server 14 and printers 18 via link 20. Printers 18 represent generally any combination of hardware and programming capable of receiving a print job from the computing device 12, directly or indirectly via link 20, and fulfilling the print job as printed output on a print medium.

In an embodiment, server 14 is shown to include a processor 32 and memory 34. Processor 32 represents generally any device capable of executing program instructions stored in memory 34. Memory 34 represents generally any memory configured to store program instructions and other data. Memory 34 is shown to include operating system 36, a web server 38, and a fulfillment module 40. Operating system 36 represents generally any software platform on top of which other programs or applications such as the web server 38 and fulfillment module 40 run. Web server 38 represents generally any programming that, when executed, stores, delivers and receives web pages, documents, digital images and other content to and from computing devices via the internet.

Fulfillment module 40 represents generally any programming that, when executed, implements the functionality of the fulfillment selector of FIG. 2. In an embodiment, fulfillment module 40, when executed by processor 32, is responsible for receiving a print job. A solution set is determined that includes a plurality of printing solutions. An administrative policy may be used to establish a set of possible options when determining the solution set. Previously-expressed preferences, previously-observed behaviors, and/or user context data may be utilized in determining the solution set. The solution set is presented including values for printing solutions according to negotiation attributes. An invitation is extended to select a negotiation attribute to be prioritized. The solution set is redetermined according to the selected negotiation attribute, and the redetermined solution set is presented. Upon selection of a printing solution from the redetermined solution set, a printer is caused to print the print job according to the selected printing solution.

Figure 4:
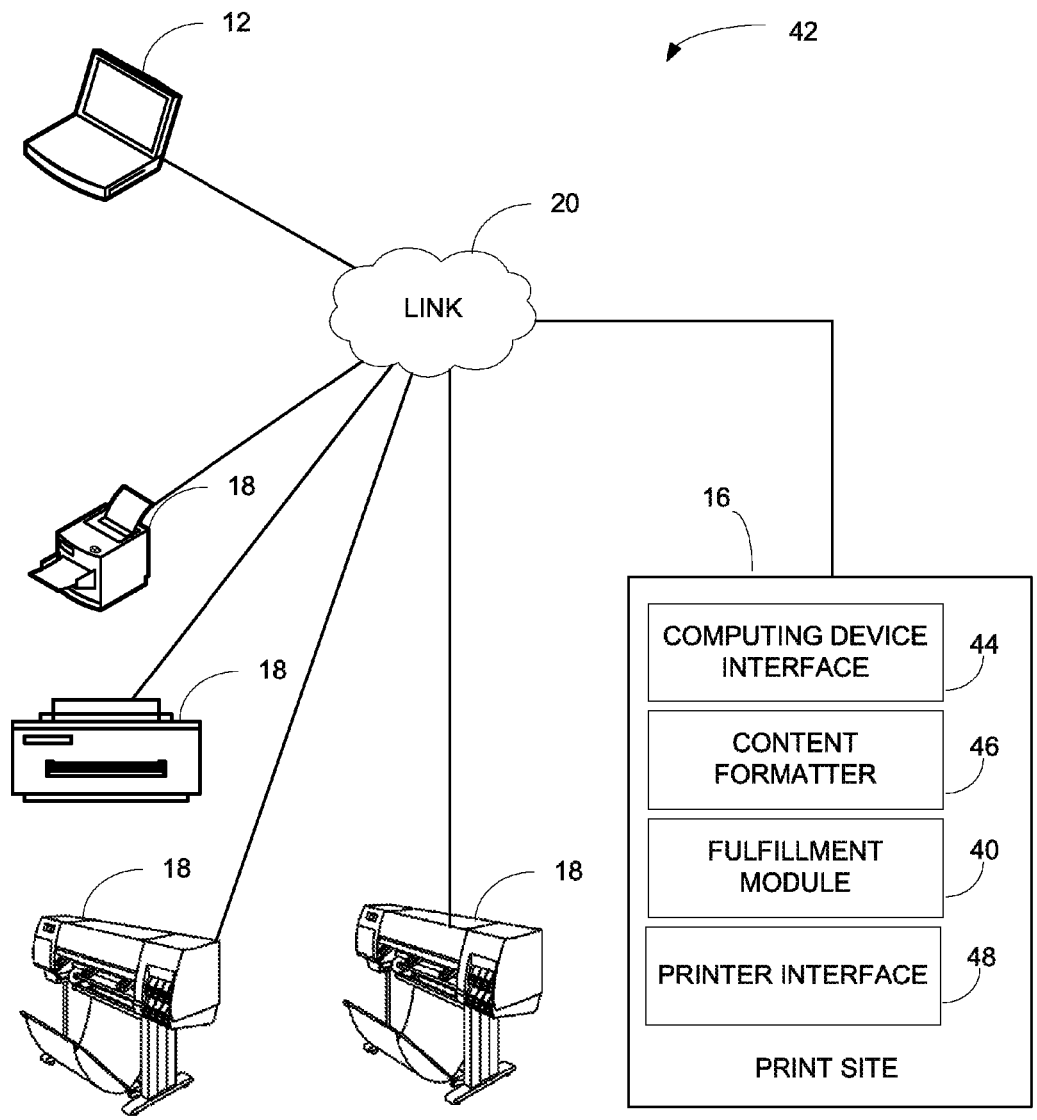

Moving to FIG. 4, an implementation is depicted in which some of the actions taken by server 14 in FIG. 3 are now taken by a print site server 16. In particular, a computing device 12 may communicate print fulfillment requests to print site server 16 via a link 20, and a fulfillment module 40 residing on the print site server 16 may enable users to consider and select between multiple negotiation attributes of concern and cause fulfillment of a print fulfillment request based upon the selected negotiation attributes.

Environment 42 includes a computing device 12, a link 20, a print site server 16 and printers 18. In an embodiment computing device 12 may be a laptop computing device with Bluetooth®, Internet, wireless or wired connectivity to printer 18 via the link 20, and internet connection to the print site server 16 via the link 20. Printers 18 represents generally any combinations of hardware and programming capable of receiving a print job from the print site 16 and fulfilling the print job as printed output on a print medium.

In an embodiment, print site 16 is shown to include a computing device interface 44, a content formatter 46, a fulfillment module 40 and a printer interface 48. Computing device interface 44 represents generally any combination of hardware and programming capable of receiving a print job from a computing device 12 or any combination of hardware and software configured to send a print job. Content formatter 46 represents generally any combination of hardware and programming operable to format received content for printing. Such may include formatting the content, as-is, into a format compatible for printing by printer 18. Example formats include Post Script, PDL (Page Description Language), and PDF (Portable Document Format).

Fulfillment module 40 represents generally any programming that, when executed, implements the functionality of the fulfillment selector 22 of FIG. 2. Fulfillment module 40 represents generally any programming that, when executed, implements the functionality of the fulfillment selector of FIG. 2. In an embodiment, fulfillment module 40, when executed by processor 32, is responsible for receiving a print job. A solution set is determined that includes a plurality of printing solutions. The solution set is presented including values for printing solutions according to negotiation attributes. Negotiation attributes can include, but are not limited to, cost of fulfillment attributes, delivery attributes, page attributes, and environmental impact attributes. An invitation is extended to select a negotiation attribute to be prioritized. Selected negotiation attributes may be asynchronously received from a user, or a computing device or combination of hardware and programming configured to select negotiation attribute. The solution set is redetermined according to the selected negotiation attribute, and the redetermined solution set is presented. Upon selection of a printing solution from the redetermined solution set, a printer is caused to print the print job according to the selected printing solution.

Printer interface 48 represents generally a combination of hardware and programming capable communicating a print job for the formatted content to printer 18. Printer interface 48 may be responsible for receiving communications from printer 18 and then using computing device interface 44 to route the communications back to computing device 12. Such communications may include an indication that the print job was received, the print job has been printed, any error messages, and any other information related to the print job.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 5:
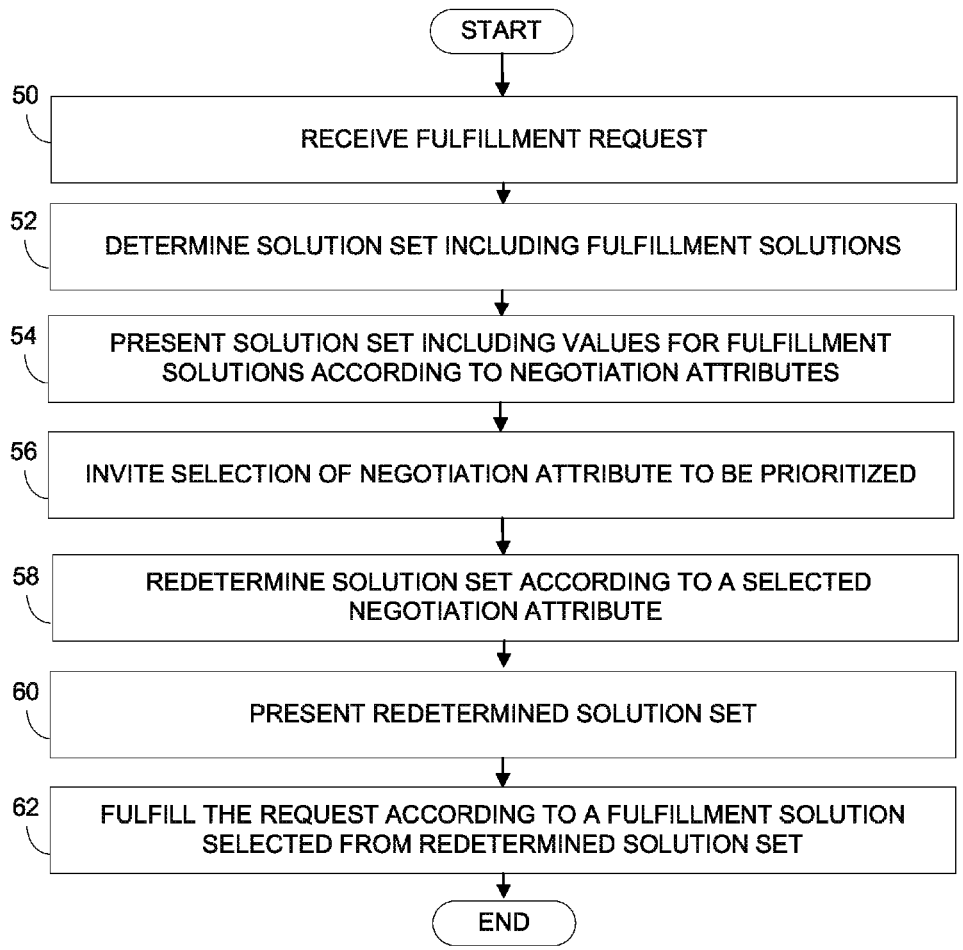
FIGS. 5-6 are example flow diagrams depicting embodiments of a fulfillment method.
Figure 6:
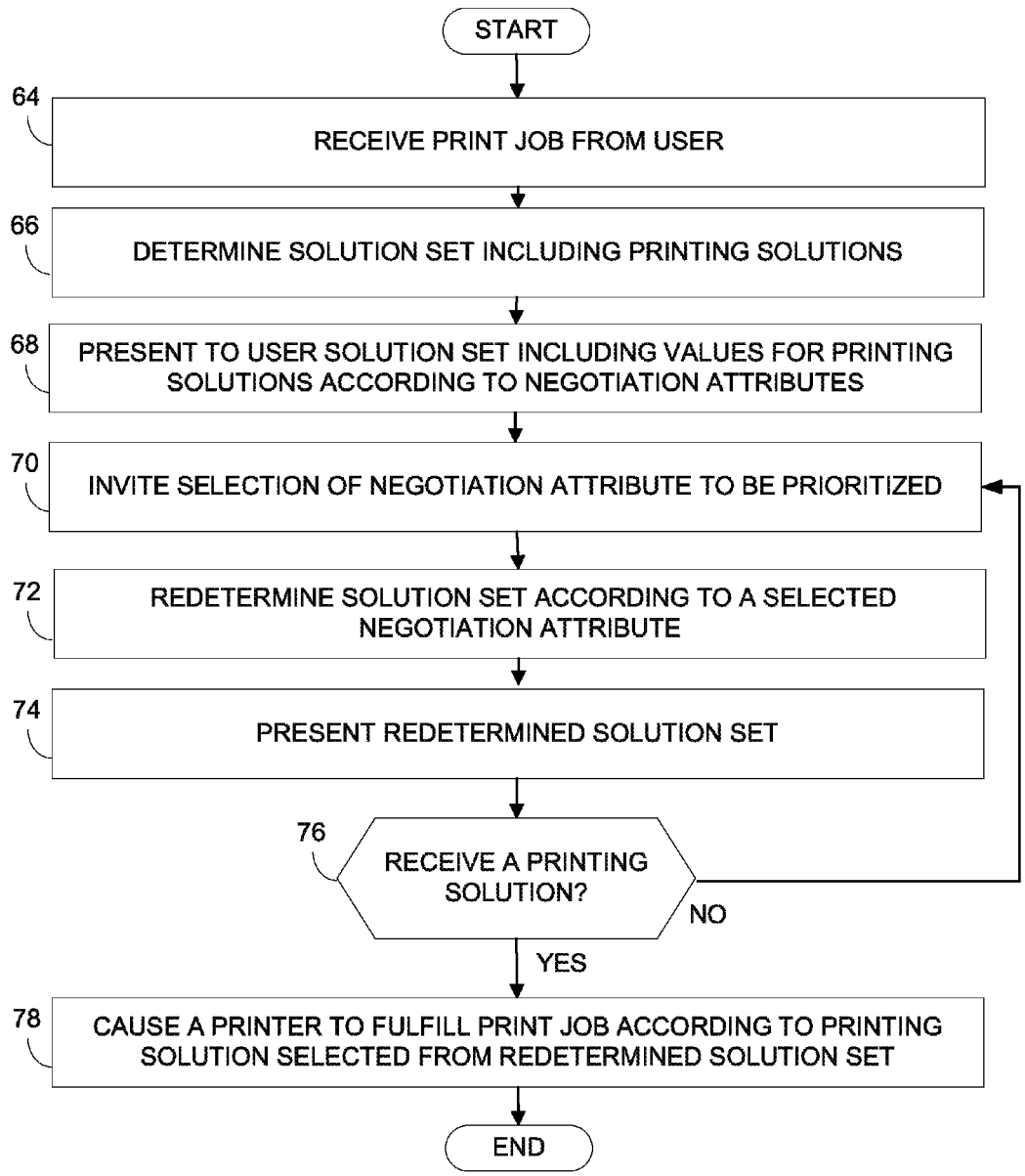

OPERATION: FIGS. 5-6 are example flow diagrams depicting example embodiments of a fulfillment method. In discussing FIGS. 5-6, reference may be made to the diagrams of FIGS. 1-5 to provide contextual examples. Implementation, however, is not limited to those examples.

Starting with FIG. 5, a fulfillment request is received (block 50). Referring back to FIG. 2, the receipt engine 25 may be responsible for implementing block 50. In embodiments, the fulfillment request includes a request to print a print job. In an embodiment, the fulfillment request may be received from a user via client computing device. In an embodiment, the fulfillment request may be received directly from a computing device. In an embodiment, the fulfillment request may be received from a client computing device via an intermediary server.

Continuing with the flow diagram of FIG. 5, a solution set including fulfillment solutions is determined (block 52). Referring back to FIG. 2, determination engine 26 may be responsible for implementing block 52. In an embodiment, the fulfillment solutions include printing solutions, and determining a solution set includes calculating possible solution set options utilizing knowledge of the capabilities of available printers and associated systems (e.g. location, speed, status, etc.).

Continuing with the flow diagram of FIG. 5, a solution set is presented including values for fulfillment solutions according to negotiation attributes (block 54). Referring back to FIG. 2, the determination engine 26 may be responsible for implementing block 54. In an embodiment, the fulfillment solutions are printing solutions, and the presented negotiation attributes include cost of fulfillment, environmental impact attributes, delivery attributes, and page attributes. In an embodiment, the fulfillment request may be received from a user via client computing device. In an embodiment, the solution set is presented to a user via a user interface, e.g. a computer monitor or smart phone touch screen. In an embodiment, the solution set is presented to a computing device.

Continuing with the flow diagram of FIG. 5, an invitation to select a negotiation attribute to be prioritized is extended (block 56). Referring back to FIG. 2, the redetermination engine 27 may be responsible for implementing block 56. In an embodiment, the invitation may be extended to a user via user interface device, such as a computer monitor or a smart phone touch screen. In an embodiment, the invitation is extended to a computing device or a combination of hardware and programming configured to receive the invitation via electronic means.

Continuing with the flow diagram of FIG. 5, the solution set is redetermined according to a selected negotiation attribute (block 58). Referring back to FIG. 2, the redetermination engine 27 may be responsible for implementing block 58. In an embodiment, a selected negotiation attribute may be received from a user via a user clicking on or otherwise activating button graphics on a computing device interface. In another embodiment, a selected negotiation attribute is received from a computing device or a combination of hardware and programming configured to select a negotiation attribute, such that a computer to computer selection occurs according to program instructions. In an embodiment, a plurality of selected negotiation attributes are asynchronously received, and the solution set is redetermined after each receipt of a new selected negotiation attribute. In an embodiment a plurality of selected negotiation attributes are incrementally received, and the solution set is redetermined after each receipt of selected negotiation attribute.

Continuing with the flow diagram of FIG. 5, a redetermined solution set is presented (block 60). Referring back to FIG. 2, the redetermination engine 27 may be responsible for implementing block 60. In an embodiment, the redetermined solution may be presented to a user via a user interface device. In an embodiment, redetermined solution may be presented to a computing device or a combination of hardware and programming configured to receive the redetermined solution via electronic means.

In an embodiment, a plurality of selected negotiation attributes may be asynchronously received, and blocks 56, 58 and 60 may be repeated.

Continuing with the flow diagram of FIG. 5, the fulfillment request is fulfilled according to a fulfillment solution selected from the redetermined solution set (block 62). Referring back to FIG. 2, the delivery engine 28 may be responsible for implementing block 62. In an embodiment, fulfilling the fulfillment solution may include sending the print job to a specific identified printing device. In an embodiment, fulfilling the fulfillment solution includes sending the print job to a printing service without identifying a specific printing device.

Moving on to FIG. 6, in a particular implementation, a print job is received from a user (block 64). Referring back to FIG. 2, the receipt engine 25 may be responsible for implementing block 64. Continuing with the flow diagram of FIG. 6, a solution set including printing solutions is determined (block 66). Referring back to FIG. 2, determination engine 26 may be responsible for implementing block 66. In an embodiment, determining a solution set includes utilizing an administrative policy. For example a policy that limits a user to two-sided printing may be utilized to pre-filter a list of presented options such that the solution set presented to the user does not include options for single-sided printing. In embodiments, previously-observed behaviors, previously-expressed preferences, and/or user context data may be utilized in determining the solution set. In an embodiment, determining a solution set includes analyzing the print job (which may include analyzing documents and/or images within the print job), and the results of analyzing the print job are utilized in determining a solution set. For example, an analysis of a print job may reveal that the print job contains no color images or text, such that the determined solution may include black and white printing solutions and color printing solutions.

In another example, an analysis of a print job may reveal that the print job contains color charts with highly detailed lines, such that the determined solution will include printing solutions that are capable of accurately reproducing the charts.

Continuing with the flow diagram of FIG. 6, a solution set is presented to a user, the solution set including values for fulfillment solutions according to negotiation attributes (block 68). Referring back to FIG. 2, the determination engine 26 may be responsible for implementing block 68. In an embodiment, the solution set is presented to the user via a user interface, e.g. a computer monitor or touch screen.

Continuing with the flow diagram of FIG. 6, an invitation to select a negotiation attribute to be prioritized is presented to the user (block 70). The solution set is redetermined according to a selected negotiation attribute (block 72). Referring back to FIG. 2, the redetermination engine 27 may be responsible for implementing blocks 70 and 72. For example, a selected negotiation attribute may be received from a user via the user clicking on or otherwise activating a button graphic on a computing device interface.

In some instances redetermining a solution set includes revising the solution set to take into account the selected negotiation attributes. For example, a solution set may be presented to a user that is made up of fulfillment solutions A, B, C and D, and the solution set may be redetermined according to a user selected attribute of impact to the environment to include fulfillment solutions A, B, E and F. In other instances, redetermining a solution set will result in a solution set that is currently presented to a user being the same as the solution set that was last presented to the user. This can occur, for example, if a user clicks a "greener" button to select an "impact to the environment" negotiation attribute, and the optimal solution set for the impact to the environment negotiation attribute is already being presented. In an embodiment, an alert can be sent to a user if a current presented solution set is the same as a last presented solution set. Examples of such an alert are sending to the user a message that selected negotiation attribute is "at the limit," and/or sending to the user a message that the solution set is the "same solution set as last presented."

Continuing with the flow diagram of FIG. 6, a redetermined solution set is presented (block 74). Referring back to FIG. 2, the redetermination engine 27 may be responsible for implementing block 74. In an embodiment, the redetermined solution may be presented to a user via a user interface device.

Continuing with the flow diagram of FIG. 6 at block 76, if a printing solution is received, a printer is caused to fulfill the print job according to a printing solution selected from a redetermined solution set (block 78) and the method ends. Otherwise, the actions described in blocks 70-74 may be repeated until a printing solution selected from a redetermined solution set is received. Referring back to FIG. 2, the redetermination engine 27 may be responsible for implementing block 76 and the delivery engine 28 may be responsible for implementing block 78. In one embodiment, if a plurality of solution sets are determined and presented, the printing solution is selected from the last presented redetermination solution set.

Figure 7A:
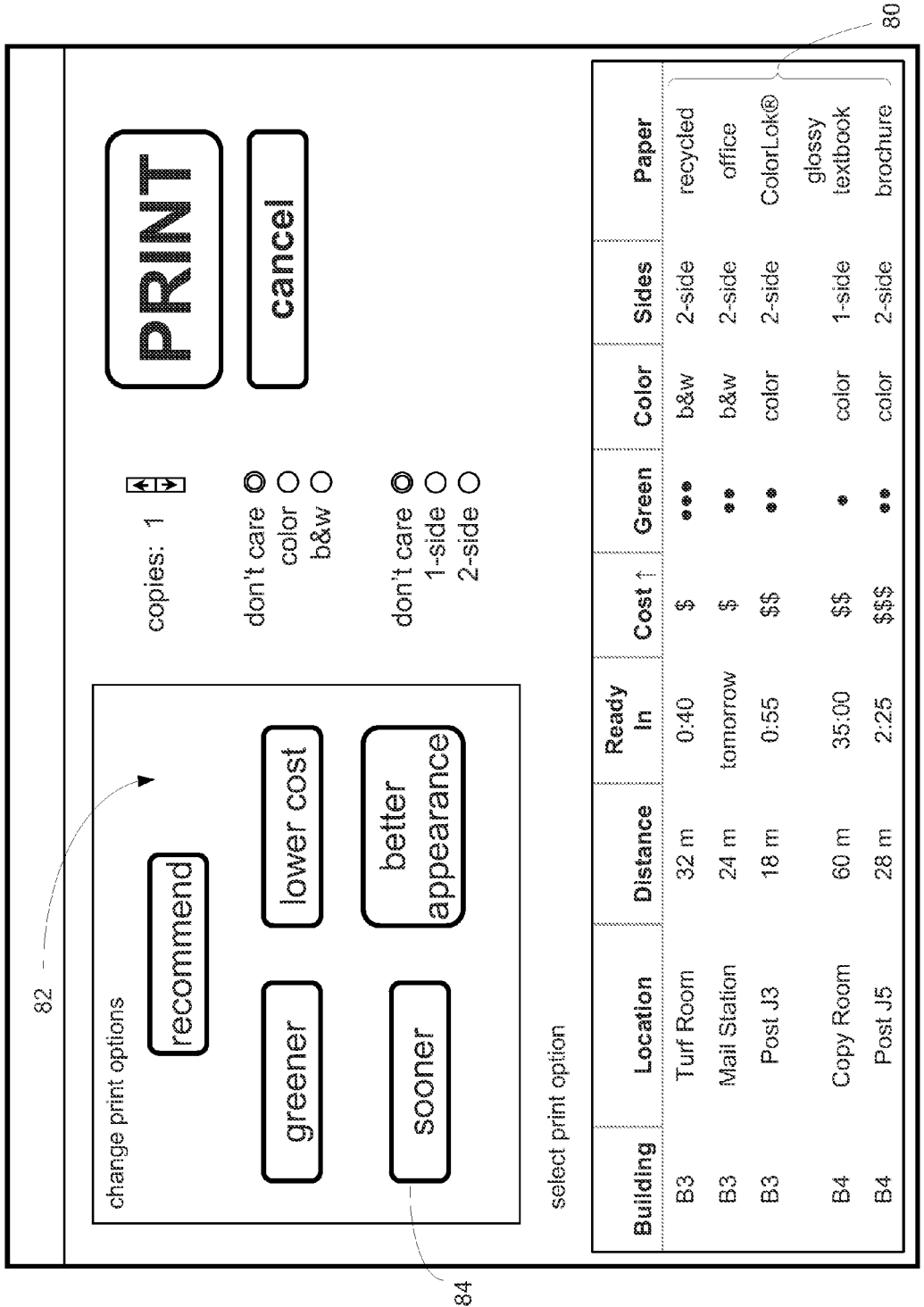
FIG. 7A-7B depict screen shots of a user interface, according to an embodiment.
Figure 7B:
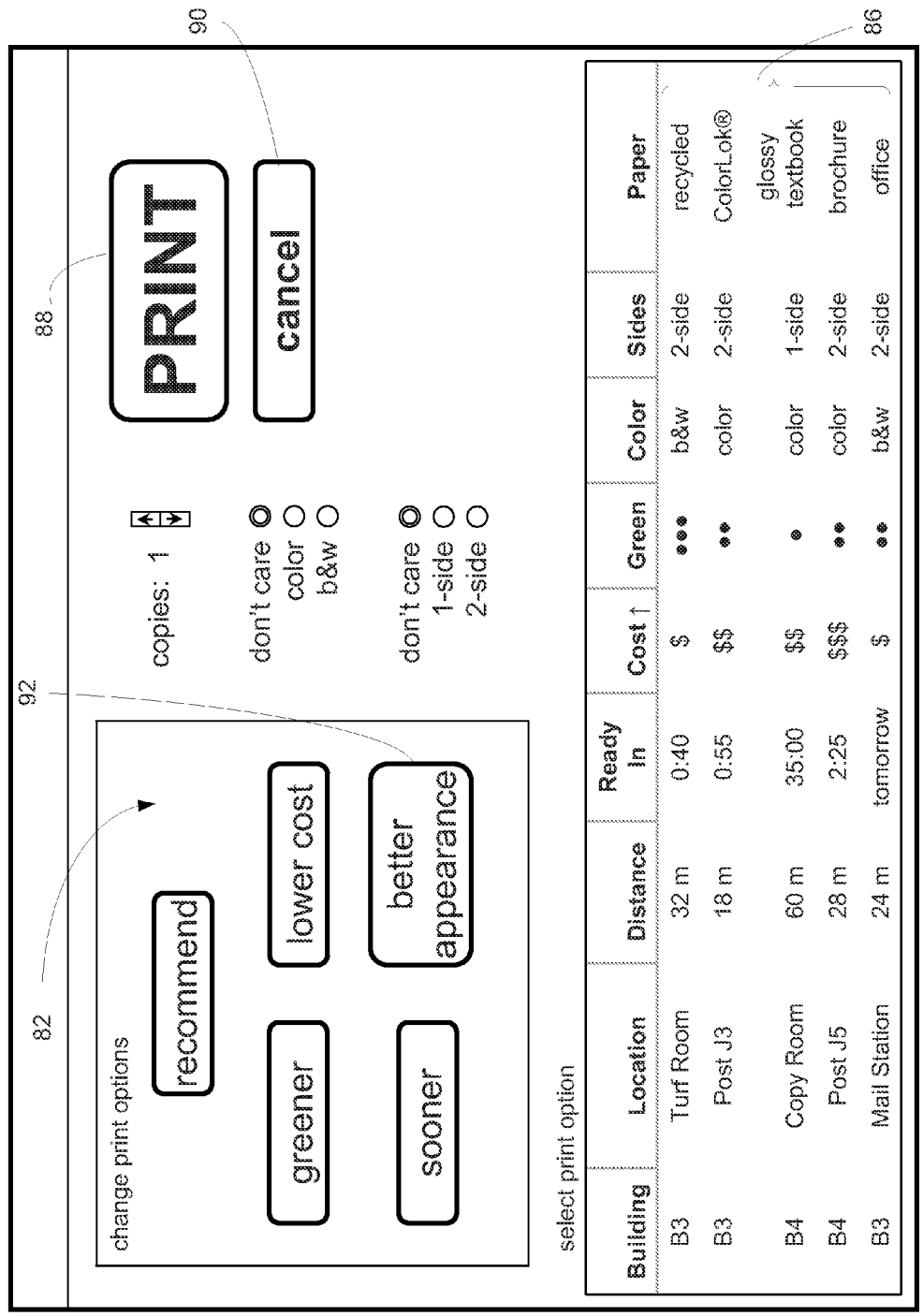

Examples:

The diagrams of FIG. 7A-B depict example screen shots that illustrate a method of print fulfillment utilizing selected negotiation attributes according to an embodiment. Starting with FIG. 7A, a solution set 80 including printing solutions is presented to a user. The user is invited to click on or otherwise activate negotiation attribute buttons 82 (e.g. "greener", "lower cost", "sooner", "better appearance") to select negotiation attributes of concern to the user. In this manner a user can review multiple printing solutions and trade off negotiation attributes. In an example, a user that desires to print a draft document and is more interested in speed and proximity to a delivery device or service than in quality may click the "sooner" button 84 to prioritize the "sooner" negotiation attribute.

Moving to FIG. 7B, a redetermined solution set 86 that prioritizes the user's selected negotiation attribute is presented. After presentation of the redetermined solution set 86, the user is invited to choose between making a fulfillment choice from that redetermined solution set 86 (by selecting a print option from the redetermined solution set and clicking a "print" button 88), selecting another negotiation attribute to be prioritized (by clicking another of the negotiation attribute buttons 82), or canceling the print fulfillment request by clicking the "cancel" button 90. If the user desires to further evaluate print options prioritizing another negotiation attribute, the user can select, for example, the "better appearance" button 92 and a new redetermined solution set is presented. When the user makes a fulfillment choice by selecting the "print" button 88, a printer is caused to fulfill the print job according to a printing solution selected from the redetermined solution set.

CONCLUSION: The diagrams of FIGS. 1-6 are used to depict example environments in which various embodiments may be implemented. Implementation, however, is not so limited. FIG. 1-6 shows the architecture, functionality, and operation of various embodiments. Various components illustrated in FIGS. 2-6 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 5-6 show specific orders of execution, the order of execution may differ from that which is depicted. For example, the order of execution of two or more blocks may be scrambled relative to the order shown. Also, two or more blocks shown in succession may be executed concurrently or with partial concurrence: All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method comprising:

receiving a print job;

determining a solution set comprising a plurality of printing solutions;

presenting the determined solution set including values for the printing solutions according to a plurality of negotiation attributes, wherein each negotiation attribute corresponds to at least one cost, environmental, delivery, or page attribute;

inviting selection of a negotiation attribute of the plurality of negotiation attributes to be prioritized relative to others of the plurality of negotiation attributes;

generating a redetermined solution set that includes at least one printing solution that is different from the printing solutions in the determined solution set, the generating comprising prioritizing the printing solutions in the redetermined solution set corresponding to the selected negotiation attribute, such that the redetermined solution set includes another plurality of printing solutions prioritized according to the selected negotiation attribute, wherein each of the plurality of negotiation attributes are different from one another;
presenting the redetermined solution set prioritized according to the selected negotiation attribute; and
causing a printer to fulfill the print job according to a printing solution selected from the redetermined solution set.

2. The method of claim 1, further comprising asynchronously receiving selections of respective negotiation attributes, and generating another solution set after each receipt of one of the asynchronously selected negotiation attributes.

3. The method of claim 1, further comprising incrementally receiving selections of respective negotiation attributes, and generating another solution set after each receipt of one of the incrementally selected negotiation attributes.

4. The method of claim 1, wherein redetermining further comprises utilizing previously selected negotiation attributes.

5. The method of claim 1, further comprising sending an alert if a last presented solution set is the same as a current presented solution set.

6. The method of claim 1, further comprising analyzing the print job and wherein determining a solution set includes utilizing of results of analyzing the print job.

7. The method of claim 1, wherein determining a solution set includes utilizing a previously-observed behavior of a user from previous printing fulfillment engagements.

8. The method of claim 1, wherein determining a solution set includes utilizinsan administrative policy.

9. The method of claim 1, wherein determining a solution set includes utilizing a preference previously-expressed by the user for other print jobs.

10. The method of claim 1, wherein determining a solution set includes utilizing user context data.

11. The method of claim 1, wherein at least one of the plurality of negotiation attributes corresponds to an environmental attribute.

12. The method of claim 1, wherein at least one of the negotiation attributes corresponds to a delivery attribute and at least one of the negotiation attributes corresponds to a page attribute.

13. A system, comprising:
a receipt engine to receive a print job;
a determination engine to determine a solution set comprising a plurality of printing solutions, and
present the determined solution set including values for the printing solutions according to a plurality of negotiation attributes, wherein each negotiation attribute corresponds to at least one cost, environmental, delivery, or page attribute;
a redetermination engine to invite selection of a negotiation attribute of the plurality of negotiation attributes to be prioritized, generate a redetermined solution set that includes at least one printing solution that is different from the printing solutions in the determined solution set, the generation comprising prioritizing the printing solutions in the redetermined solution set corresponding to the selected negotiation attribute, such that the redetermined solution set includes another plurality of printing solutions prioritized according to the selected negotiation attribute, wherein each of the plurality of negotiation attributes are different from one another; and
present the redetermined solution set prioritized according to the selected negotiation attribute; and
a delivery engine to cause a printer to fulfill the print job according to a printing solution selected from the redetermined solution set.

14. The system of claim 13, wherein the determination engine is additionally to analyze the print job and wherein determining a solution set includes utilization of results of analyzing the print job.

15. The system of claim 13, wherein, to determine the solution set, the determination engine is to utilize a previously-observed behavior of a user from previous printing fulfillment engagements.

16. The system of claim 13, wherein, to determine the solution set, the determination engine is to utilize user context data.

17. The system of claim 13, wherein the redetermination engine is to asynchronously receive a plurality of selected negotiation attributes.

18. A non-transitory computer readable medium storing computer executable instructions that when executed by a processor causes the processor to:
receive a fulfillment request;
determine a solution set comprising a plurality of fulfillment solutions;
present the determined solution set including values for the fulfillment solutions according to a plurality of negotiation attributes, wherein each negotiation attribute corresponds to at least one cost, environmental, delivery, or page attribute;
invite selection of a negotiation attribute of the plurality of negotiation attributes to be prioritized relative to others of the plurality of negotiation attributes;
generate a redetermined solution set that includes at least one fulfillment solution that is different from the fulfillment solutions in the determined solution set according to a selected negotiation attribute, the generation comprising prioritizing the fulfillment solutions in the redetermined solution set corresponding to the selected negotiation attribute, such that the redetermined solution set includes another plurality of fulfillment solutions prioritized according to the selected negotiation attribute, wherein each of the plurality of negotiation attributes are different from one another;
present the redetermined solution set including value function operators and prioritized according to the selected negotiation attribute; and
fulfill the fulfillment request according to a fulfillment solution selected from the redetermined solution set.

19. The medium of claim 18, the method further comprising wherein the instructions are further to cause the processor to asynchronously receive selections of respective negotiation attributes, and generate another solution set after each receipt of one of the asynchronously selected negotiation attributes.

20. The medium of claim 18, wherein, to receive a fulfillment request, the instructions are further to cause the processor to receive a request to print a print job, and wherein the plurality of fulfillment solutions comprise printing solutions.

* * * * *

UNITED STATES PATENT AND TRADEMARK OFFICE
CERTIFICATE OF CORRECTION

| | |
|---|---|
| PATENT NO. | : 8,928,911 B2 |
| APPLICATION NO. | : 12/750536 |
| DATED | : January 6, 2015 |
| INVENTOR(S) | : William J. Allen et al. |

Page 1 of 1

It is certified that error appears in the above-identified patent and that said Letters Patent is hereby corrected as shown below:

In the claims

In column 11, line 34, in Claim 8, delete "utilizinsan" and insert -- utilizing an --, therefor.

Signed and Sealed this
First Day of December, 2015

Michelle K. Lee
*Director of the United States Patent and Trademark Office*